United States Patent [19]
Kraik

[11] Patent Number: 5,485,870
[45] Date of Patent: Jan. 23, 1996

[54] WIRE WRAPPED COMPOSITE SPIRAL HOSE AND METHOD

[76] Inventor: Newell P. Kraik, 10 Harrowby Crt., Islington, Ontario, Canada, M9B 5H3

[21] Appl. No.: 349,205

[22] Filed: Dec. 5, 1994

[51] Int. Cl.⁶ .................................... F16L 11/10
[52] U.S. Cl. ................. 138/122; 138/125; 138/121; 138/129
[58] Field of Search ................. 138/122, 121, 138/125, 129, 137, 173, 178, 177; 156/143, 144

[56] References Cited

U.S. PATENT DOCUMENTS

| | | | |
|---|---|---|---|
| 992,516 | 5/1911 | Mulconroy et al. | 138/122 X |
| 1,280,170 | 10/1918 | Crawford | 138/122 |
| 1,746,701 | 2/1930 | Kimmich | 128/121 |
| 2,810,400 | 10/1957 | Hewitt | 138/122 |
| 3,130,753 | 4/1964 | Monnen | 138/129 X |
| 3,218,210 | 11/1965 | Waddell, Jr. | 156/143 |
| 3,453,359 | 7/1969 | Clement et al. | 264/322 |
| 3,835,891 | 9/1974 | White | 156/144 X |
| 3,889,716 | 6/1975 | Linhart | 138/129 |
| 3,908,704 | 9/1975 | Clement et al. | 138/21 |
| 3,916,505 | 11/1975 | White | 29/456 |
| 4,098,298 | 7/1978 | Vohrer | 138/122 |
| 4,196,031 | 4/1980 | Lalikos et al. | 156/143 |
| 4,342,612 | 8/1982 | Lalikos et al. | 156/143 |
| 4,804,019 | 2/1989 | Kramer, Jr. | 138/122 X |
| 5,042,138 | 8/1991 | Umemori et al. | 29/527.4 |
| 5,182,147 | 1/1993 | Davis | 428/34.4 |

FOREIGN PATENT DOCUMENTS

| | | | |
|---|---|---|---|
| 1243636 | 9/1960 | France | 138/122 |
| 349965 | 5/1931 | United Kingdom | 138/122 |
| 557114 | 11/1943 | United Kingdom | 138/122 |
| 1312509 | 4/1973 | United Kingdom | 138/122 |
| 1383313 | 2/1975 | United Kingdom | 138/122 |

OTHER PUBLICATIONS

UK Patent Application 2,057,779 Davay et al.
Everflex Product Catalog—Dana Corp, 1992.

Primary Examiner—David Scherbel
Assistant Examiner—Patrick F. Brinson
Attorney, Agent, or Firm—Crossetta & Associates

[57] ABSTRACT

The invention discloses a wire wrapped composite spiral hose, having a plurality of layers of fabric wrapped around a preformed convolute hose and held in place by a continuous wire spaced within the convolutions. A method and device for preparing the hose is disclosed using parallel elongate mandrels which are synchronized to rotate and apply the wire spaced in the convolutions.

15 Claims, 3 Drawing Sheets

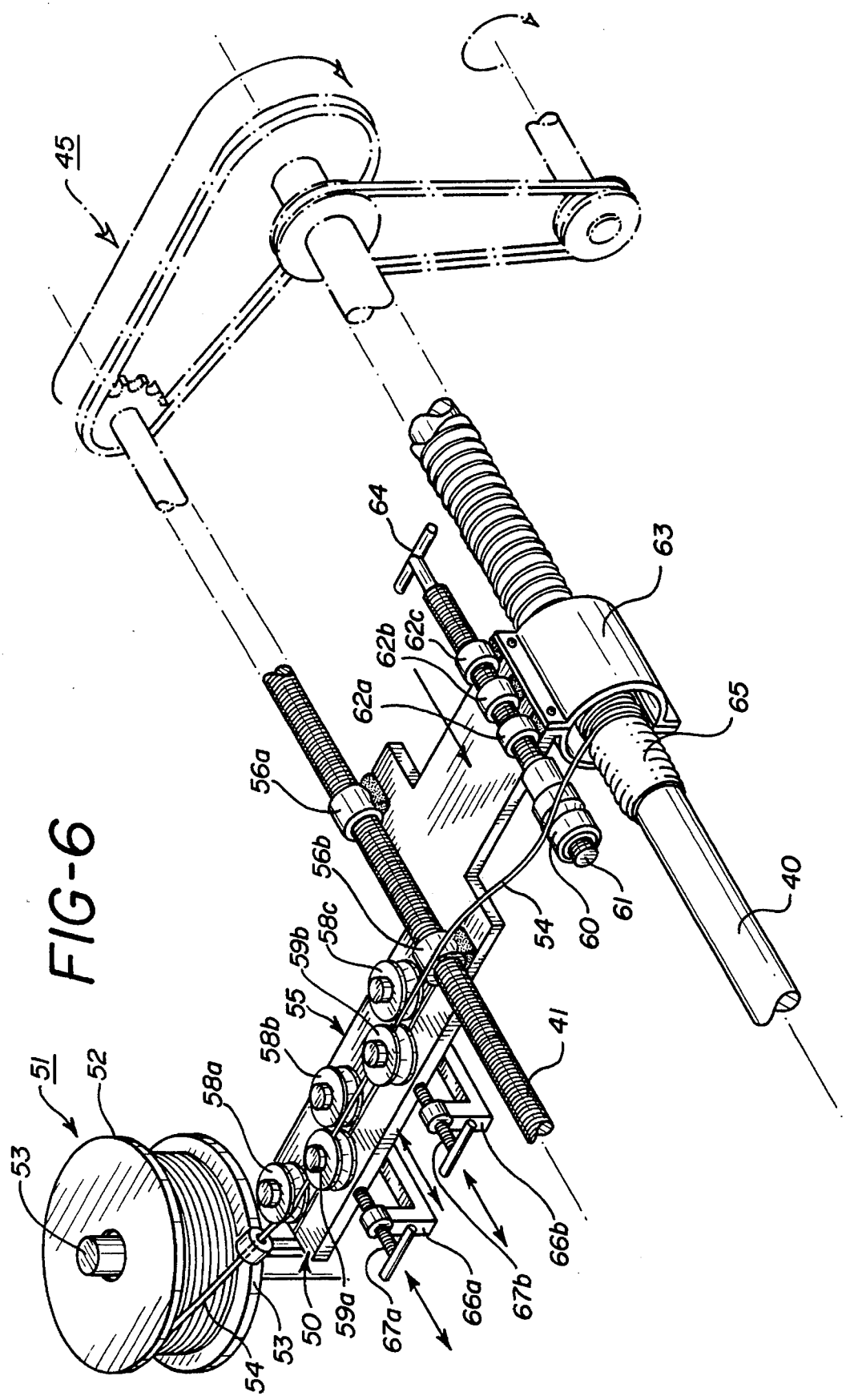

WIRE WRAPPED COMPOSITE SPIRAL HOSE AND METHOD

The present invention relates to wire wrapped composite spiral hose, more particularly to semirigid, convoluted extruded plastic hose, having a plurality of layers of fabric wrapped around it which are held in place by wire, and a method and apparatus for making same. The hoses of the invention have the capability of transmitting fluids under high pressure and improved resistance to crushing by external force.

BACKGROUND OF THE INVENTION

There is a continuing need for flexible hoses for the safe transmission of fluids in industry. Of particular need is a rough service flexible hose that can withstand the high pressure transmission of corrosive fluids, yet is resistant to chafing, wearing and crushing forces which are endemic in the rough service work place.

Extruded convoluted plastic hoses have been developed by industry as flexible means for the transmission of corrosive fluids and are commercially available in a variety of plastic materials including highly resistant materials such as polytetrafluoroethylene (Teflon) and the like. In one configuration, the convolutions are arranged as disconnected annular valleys which separately encircle the perimeter of the hose along its length and have mating adjacent annular valleys along its interior passageway to resist collapse of the passageway. Such configuration provides flexibility and some resistance to collapse of the hose but is generally seen as not suitable for rough service in that flexing tends to create breaks in the hose and the internal valleys tend to collect fluid which resists drainage from the internal passageway.

In another configuration, hoses are formed such that the exterior of the hose comprises a continuous valley configured as an endless spiral through the length of the hose, with the interior passageway of the hose comprising an adjacent mating spiral valley through its length. Such convolution provides structural integrity to the passageway of the hose in that it tends to resist collapse of the passageway and the interior spiral promotes drainage of the passageway. Such hose is still not generally seen as suitable for high pressure and/or vacuum use in a rough service environment in that its ability to resist collapse and rough service treatment in the work place is not great.

U.S. Pat. Nos. 4,196,031 and 4,342,612 disclose improved extruded spiral convoluted plastic hose wherein a wire spring, formed to a spiral, is wrapped around the hose within the exterior valley, sized so that the spring snaps into the exterior valley of the convoluted hose and is captured by the sides of the valley of the plastic hose in an arrangement where the wire nests the hose to resist collapse of plastic hose. The wire is preformed and stressed to maintain a helical form generally conforming to the helix of the extruded spiral plastic hose. The valley and the wire are sized so that the walls of the valley resist release of the spring once it is snapped in and thus the spring supports the plastic hose from internal collapse.

In order to apply the wire to the extruded hose, the patents disclose a method wherein wire is preformed to a helical diameter smaller than the spiral of the plastic hose and mounted to rotate around the preformed hose as the hose progresses from an extruding head through a wire wrapping station. Thus, the hose is moved longitudinally through a point and wire is applied without supporting the passageway from collapse. Such method requires close tolerances to assure the nesting of the wire in the valley without collapse and/or damage to the hose and particularly critical tolerances when the hose is heated or otherwise softened to provide a nested effect by the walls of the valley as disclosed in the patents. To avoid chafing of the wire against the extruded plastic hose, the patents describe laying a 0.010 inch fiber glass interleaving tape in the crotch of the valley positioned between the spring and the hose.

Such hose of the above patents are said to provide some improvement in resistance to vacuum collapse of a preformed spiral hose. It appears that the improvement is in large part dependent upon the effectiveness of the capture of the wire by adjacent sides of a valley and thus the ability to hold close tolerances in the application of the wire and/or the degree of other means which might be used to envelope or otherwise resist outward movement of the wire from the valley and/or inward movement of the plastic from the wire.

Such hose as disclosed in the patents provide little if any improved resistance to burst under high pressure fluid flow, in that the captured nesting within the valley appears to preclude support to peeks between valleys and damage caused by the wire chafing the hose within the valley is problematic in reducing resistance to bursting.

It is an object of the present invention to provide a composite, preformed hose having improved resistance to high fluid pressures.

It is a further object of this invention to provide a composite, preformed hose having resistance to crushing and abrasion.

It is a further object of the present invention to provide a method and apparatus for the manufacture of composite preformed hose.

These and other objects of the invention will be apparent from the following.

SUMMARY OF THE INVENTION

The hose of the present invention is a composite hose, comprising a preformed plastic hose base structure, which has an exterior surface comprising a spiral convolution formed therein, a plurality of fabric and/or film laminates enveloping the convoluted exterior surface of the base structure and a wire continuously wrapped along the spiral convolution and holding said laminates in place around said plastic hose base by engaging the outer layer of the plurality of fabric laminates within the spiral convolution.

In the method of the present invention, preformed spiral convoluted hose of definitive length is mounted to a first elongate rotatable mandrel. A plurality of layers of sheet fabric and/or film is wrapped along the length of the extruded hose to provide a composite hose, with each layer at least in part overlapping itself and subsequent layers overlapping previous layers. The composite hose is rotated with the mandrel and wire is progressively applied along the rotating hose engaging the top layer along the spiral valley of the hose.

The apparatus of the method generally comprises elongate first and second parallel mandrels with the hose mounted to the first mandrel and a wire dispensing means mounted to the second mandrel in such manner as to progressively move along the second mandrel and dispense wire to the spiral valley in synchronization with the rotation of the hose on the first mandrel. In a preferred embodiment the second mandrel comprises an elongate screw mandrel mounted in synchronized timed rotation with the first mandrel. A wire dispensing means is mounted to the screw mandrel in an arrangement such that as the composite hose rotates with the first mandrel, wire is dispensed progressively along the screw mandrel, from a point adjacent the spiral of the convolution of the rotating hose, in synchronized application of the wire along the valley of the spiral convolution.

In a further preferred embodiment, the second mandrel comprises cogs along its length and the wire dispensing means is mounted to a driven gear means which engages the cogs and moves the dispensing means along the length of the mandrel, synchronically with the rotation of the first mandrel, in synchronized application of the wire along the valley of the spiral convolution of the rotating hose.

The wire dispensing means may comprise a store of wire or may receive wire from a location remote from the point of dispensing. Generally, when receiving wire from a remote location the wire dispensing means merely comprises a wire guide or the like which defines the direction that the wire is dispensed to the hose.

The composite hose of the present invention can be formed from a wide variety of diverse materials. The preformed hose can be of any suitable natural and/or synthetic polymeric material such as rubber, neoprene, nylon, rayon, polyethylene, polyvinylchloride, polypropylene, mixtures and/or copolymers thereof and the like. Preferred plastic materials for use in the preformed hose of the invention are the fluorinated hydrocarbons, particularly those known as Teflon, such as polytetrafluoroethylene, and copolymers of tetrafluoroethylene and hexafluoropropylene and the like.

The plurality of layers can comprise various materials in diverse arrangement and layer thickness on the preformed hose. The layers can be fabrics and/or films and the like. The term fabric, as used hereinafter, is intended to include films and the like and any woven, knitted or felted fabrics, mixtures thereof and the like for purposes of this invention. Nylons, rayons, Kevlar, polyesters, poly-propylene, polyvinylchloride, polyethylene and/or copolymers thereof are generally preferred materials. In various embodiments, nonwoven fibrous layers of fiber glass, graphite, ceramic, polyesters and the like can be interspaced among layers of fabric to provide insulation, fire-retardancy, bulk or the like qualities to the composite hose.

The various layers of fabric may be of different or the same thickness. Generally it is preferred that the each layer of fabric have a thickness of from about 2 to about 100 mils.

The fabric may be arranged so that the final wire wrap protrudes above the surface of the top fabric layer or forms a nest within a valley of the spiral convolution of the preformed hose. Generally, In a rough service environment, the arrangement of layers is such that a surface of the wire is arranged above the surface of the top fabric layer and thus engages a surface that the hose may be dragged over in such manner that the top fabric layer is spaced from abrasive forces.

In other embodiments, the layers may be arranged in a pillowy configuration and the wire is tightly wrapped to distend the fabric in the valley toward the preformed hose and nest the wire within the valley of the preformed hose. In such arrangement a surface of the top layer of the fabric can pillow around the wire and space the wire from engaging a surface on which the hose may lay.

The wire may be of any convenient material, but preferably is comprised of metal, plastic or the like. Generally a metal wire is used for rough service environments and in a preferred embodiment a metal wire is coated or treated with a resistant material such as a galvanizing treatment, paint, plastic and particularly a Teflon material or the like.

BRIEF DESCRIPTION OF THE DRAWINGS

FIG. 6 is a perspective view of an apparatus of the invention.

DETAILED DESCRIPTION OF THE DRAWINGS

Figure 1:
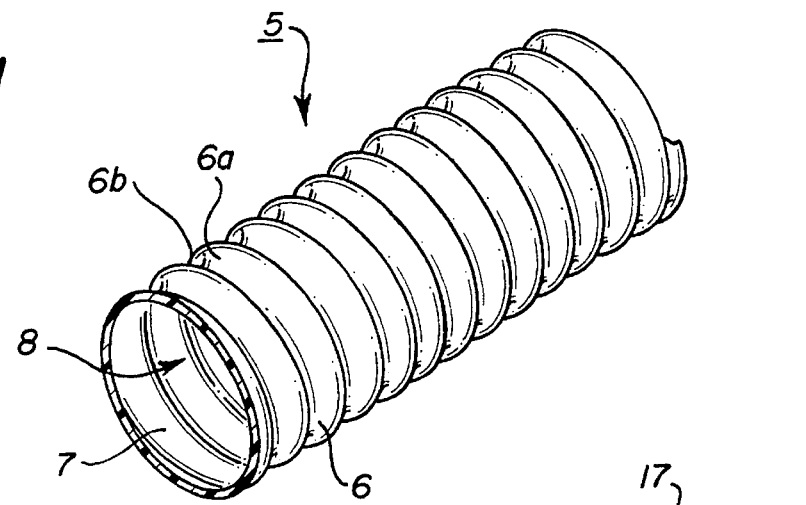
FIG. 1 is a perspective view of a preformed spiral convoluted hose of the prior art.

FIG. 1, depicts a preformed flexible hose base structure 5 of the prior art, comprising an outer surface having a continuous valley 6 shaped in the form of a spiral convolution and having side walls 6a and 6b. Flexible hose 5 is generally extruded from a suitable plastic material, preferably a resistant plastic such as a fluorinated plastic or the like, and the inner surface 7 of interior passageway 8 is shaped in generally conforming spiral convolution with the outer surface.

Figure 2:
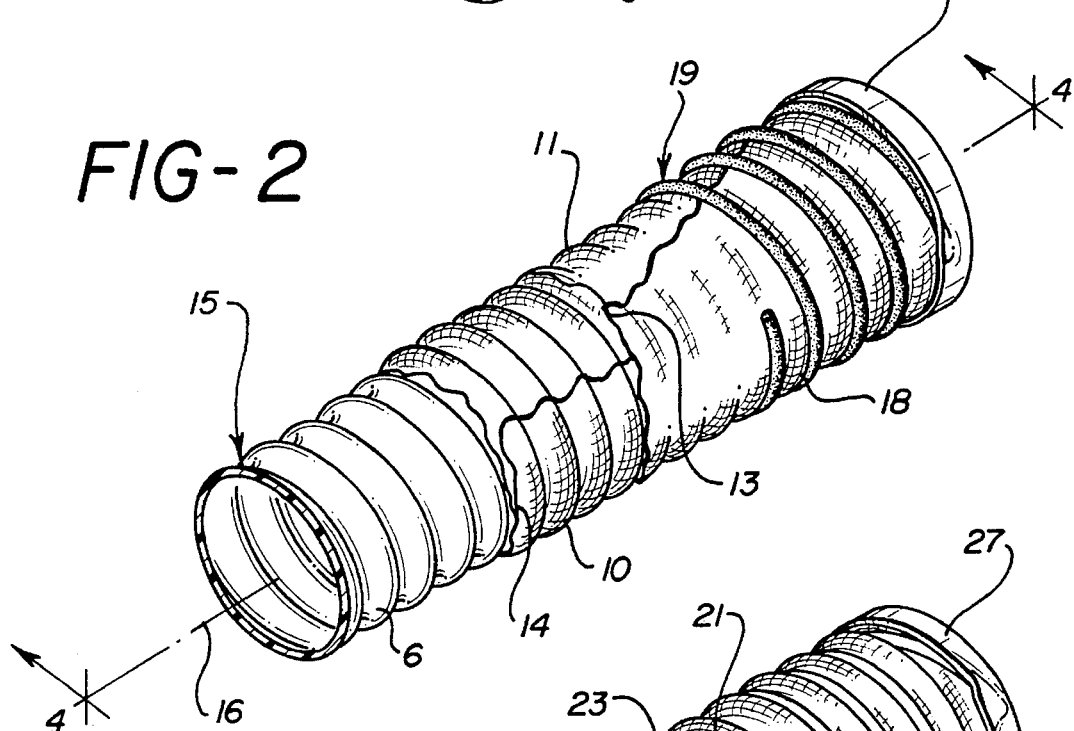
FIG. 2 is a perspective view of a composite hose of the invention.
Figure 4:
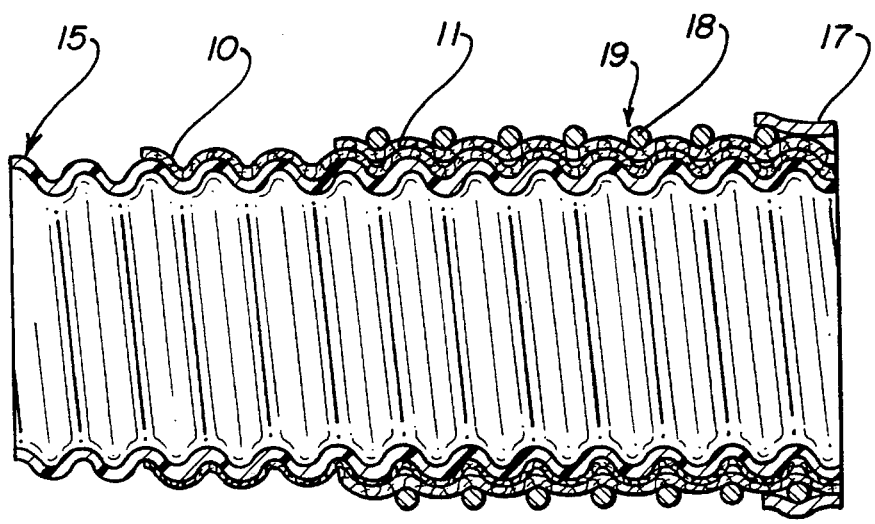
FIG. 4 is a cross-sectional view of the composite hose of FIG. 2 taken along about line 4—4.

FIGS. 2 and 4 depict an embodiment of the composite hose of the invention wherein preformed flexible hose base structure 15 comprises an inner layer of woven fabric covering 10, an outer layer of woven fabric covering 11, held to base structure 15 by wire 18. In this embodiment wire 18 is illustrated as comprising a coating 19 and is held in place at an end by a clamp 17. Inner layer 10 is illustrated as being a single sheet of fabric which is overlapped at 14 with the overlap seam extending along the length of the base hose structure, generally parallel to the longitudinal axis 16 thereof. Outer layer 11 is also illustrated as being a single sheet of fabric, it being overlapped at 13 with the overlap seam extending along the length of the base hose structure, generally in spiral arrangement to longitudinal axis 16. Wire 18 is illustrated as engaging outer fabric layer 11 generally within the valley of the spiral convolution of the base hose structure and arranged so that a surface of the wire extends above outer fabric layer 11 spaced to provide a surface for engaging a surface which might abrade outer fabric layer 11.

Figure 3:
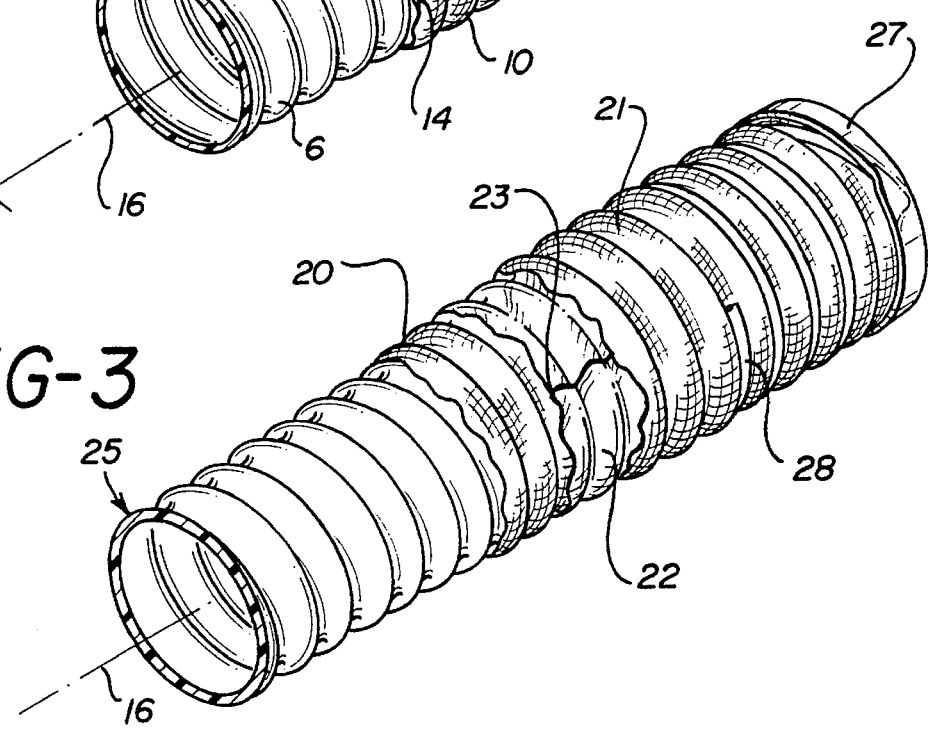
FIG. 3 is a perspective view of another composite hose of the invention.

FIG. 3 depicts an embodiment of the composite hose of the invention wherein preformed flexible hose base structure 25 comprises an inner layer of woven fabric covering 20, an outer layer of woven fabric covering 21 and a middle film layer 22 held to base structure 25 by wire 28. In this embodiment wire 28 is illustrated as being held in place at an end by a clamp 27. Middle layer 22 is illustrated as being a continuous film of flexible material which is overlapped at 23 with the overlap seam extending along the length of the base hose structure, generally parallel to the longitudinal axis 16 thereof. Wire 28 is illustrated as engaging outer fabric layer 21 generally within the valley of the spiral convolution of the base hose structure and arranged so that it nests within the valley and outer fabric layer 21 spaces the wire from engaging a surface which might abrade the wire.

Figure 5:
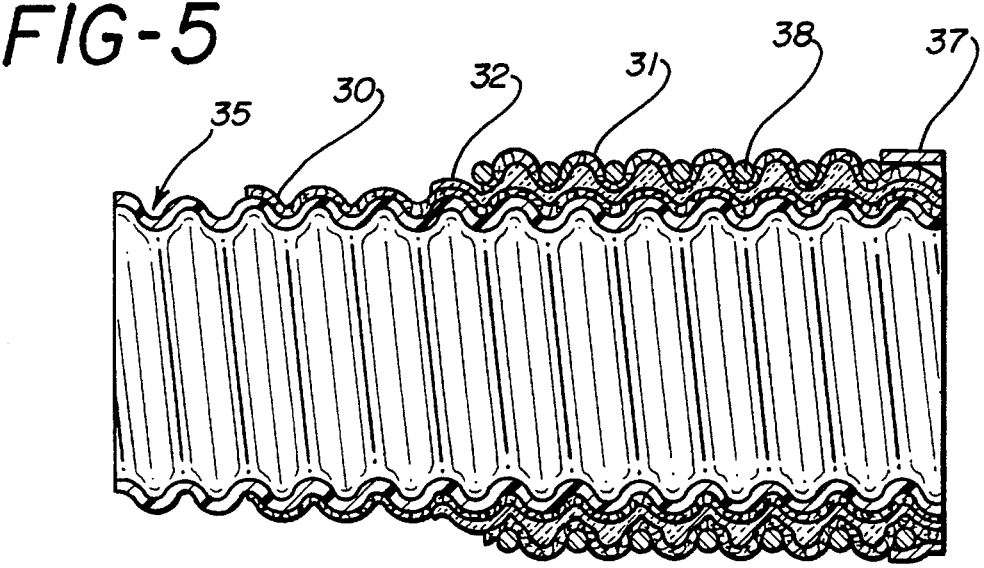
FIG. 5 is a cross-sectional view of another embodiment of a composite hose of the invention.

FIG. 5 illustrates an embodiment of the composite hose of the invention wherein preformed flexible hose base structure 35 comprises an inner layer of woven fabric covering 30, an outer layer of woven fabric covering 31 and a middle layer 32 of non-woven material held to base structure 35 by wire 38. In this embodiment wire 38 is illustrated as being held in place at an end by a clamp 37. Middle layer 32 is illustrated as being a pillowy layer of material which is arranged wherein wire 38 is engages fabric layer 31, generally within the valley of the spiral convolution of the base hose structure, and nests within the valley such that outer fabric layer 31 appears pillowy between the spaced wire.

FIG. 6 illustrates an apparatus of the invention comprising an elongate hose support mandrel 40, an elongated screw mandrel 41, synchronized mandrel drive means 45 (dotted line illustration), wire source 51 and movable rack 55. Support mandrel 40 and screw mandrel 41 are arranged in generally parallel opposition and are mounted to be held in place by supports which are not shown. Movable rack 55 is mounted to progressively move along the screw thread of screw mandrel 41 in response to the rotation of the screw mandrel within complimentary threaded housing members 56a and 56b. Wire source 51 is illustrated as comprising wire spool 52 which is rotatably mounted to support axle 53 and comprises wire 54.

Rack 55 comprises wire guide 57 and stationary tensioning wire guides 58a, 58b and 58c. Tensioning guides 59a and 59b are mounted to base 50, and movable through screw adjustors 67a and 67b, along supports 66a and 66b to enable adjustment of the position of tensioning guides 59a–b relative to adjacent tensioning guides 58a–c. Wire dispenser 60 is rotatably mounted on axle 61 which in turn is threaded and comprises handle 64 for adjustable axial mounting through threaded yokes 62a–c to rack 55. Collar 63 is mounted to rack 55 and has an interior diameter sized to allow passage of wire wound composite hose 65 therethrough.

In the method of the invention, an appropriate length of preformed flexible hose base structure is mounted to hose support mandrel 40 and fixed, generally at the drive means end, to the mandrel to rotate as the mandrel rotates.

The various layers of sheet fabric are applied to the base hose structure by the operators as appropriate to the particular composite desired. Generally the various layers are applied in precut sheets, which are of a length sized to about the length of the hose structure and a width generally greater than the circumference to be covered so that an overlap seam can be formed. The sheets are generally tightly pulled around the circumference of the hose. In a preferred embodiment an adhesive or the like is applied to form an adhering seam at the overlap of a sheet. In a further preferred embodiment, sheets of diverse materials are preattached to each other and applied as a continuous overlapping covering. It should be understood that a particular material may be overlapped upon itself one or more times to form a plurality of layers.

In a further embodiment of the invention, the hose support mandrel is rotated and the one or more layers of covering are applied to the rotating preformed hose. In a further preferred embodiment, one or more layers are applied to the rotating hose by winding a continuous length fabric of appropriate width about the axis of the hose and forming a spiral seam along the length thereof.

The application of the wire generally starts at the mandrel drive end and progresses along the mandrel to completion. In one embodiment of the invention the entire hose is appropriately assembled with the desired layers of material and the wire is thereafter applied. In another embodiment, the layers are positioned and/or repositioned along the length of the hose during the progressive application of the wire along the length of the hose to compensate for movement and/or gathering of layers in response to the application of wire tension progressing along the length of the hose.

The wire end is appropriately fastened to the hose at about the mandrel drive means end and the wire dispensing means is positioned, by means of the dispensing means axle, to angularly dispense wire to the spiral valley of the preformed hose in a direction along the path of the valley synchronized with the rotation of the lose and movement of the rack along the screw mandrel. The wire is pulled from the source by the rotation of the hose on the mandrel and the tension of the applied wire is adjusted by the tensioning guides.

The synchronization of the mandrel drive means can be fixed or adjustable during the application of wire to a hose. Generally it is preferred that the synchronization be fixed for a particular sized composite hose, wire and dwell of spiral convolution by using fixed gear and/or chain ratios. Generally with such fixed synchronization, adjustments to the placement of the wire during the application process can be conveniently achieved by the adjustment of axial position of the dispensing means and/or the adjustment of tension in the wire.

In should be understood, that it is contemplated as within the disclosure of the invention to adapt the mandrel drive means for varying synchronization of the rotation of the mandrels during or prior to application of wire. Further, it is contemplated to adapt sensing means or the like to detect variations which may relate or otherwise correlate to the application of the wire and which may be interconnected with the apparatus to effect synchronization of mandrel rotation, dispensing and/or tensioning of the wire.

Those who are skilled in the art may perceive other structures and apparatus which may also accomplish the inventive ends, in the described manner. Accordingly, the appended claims are to be construed to cover all equivalent structures falling within the true scope and spirit of the invention.

I claim:

1. A composite hose, comprising a preformed plastic hose base structure having an exterior surface comprising a spiral convolution formed therein; a plurality of layers of fabric enveloping said convoluted exterior surface of said base structure; a wire, wrapped along said spiral convolution and engaging and distending said plurality of layers of fabric against said plastic hose base; means for retaining an end of said wire to said hose; said wire engaging said fabric within said spiral convolution of said base structure.

2. The hose of claim 1 wherein a fabric layer comprises a film.

3. The hose of claim 1 comprising two fabric layers.

4. The hose of claim 1 wherein said convoluted preformed hose comprises at least one of polypropylene, polyethylene, polyvinylchloride or Teflon.

5. The hose of claim 1 comprising a woven fabric selected from the group comprising nylon, rayon, polyester, polypropylene, polyvinylchloride, polyethylene and copolymers thereof.

6. The hose of claim 1 further comprising a fibrous layer arranged between fabric layers.

7. The hose of claim 6 wherein said fibrous layer is selected from fiber glass, graphite and ceramic.

8. The hose of claim 1 wherein said wire is coated.

9. The hose of claim 1 wherein said wire extends beyond the surface of an outer layer of said fabric.

10. The hose of claim 1 wherein said fabric layers are pillowy and said wire is tensioned about said preformed hose to sink below a surface of an outer layer of said fabric.

11. A method for preparing a composite hose comprising mounting a preformed convoluted hose, having a continuous spiral valley at the surface thereof, to an elongate rotatable mandrel; wrapping a plurality of layers of sheet fabric along the length of the convoluted hose, each layer of said fabric at least in part overlapping itself and subsequent layers overlapping previous layers; rotating said convoluted hose comprising said plurality of layers and progressively wrapping, along said continuous valley of said preformed hose, a wire which engages a surface of an outer layer of said fabric and distends said fabric layers within said continuous spiral valley; and fastening said wire at an end of said hose.

12. The method of claim 11 wherein sheet fabric is overlapped around said convoluted preformed hose to form a plurality of layers.

13. The method of claim 11 wherein said sheet fabric is arranged so that the overlap extends generally parallel to the longitudinal axis of the preformed hose.

14. The method of claim 11 wherein said sheet fabric is arranged so that the overlap extends in a spiral about the longitudinal axis of the preformed hose.

15. The hose of claim 1 wherein said plurality of layers are arranged in a single sheet.

* * * * *